March 1, 1938.  H. C. SCHNEIDER  2,109,932
IMAGE FORMING DEVICE FOR AUTOMOBILES
Filed June 5, 1936
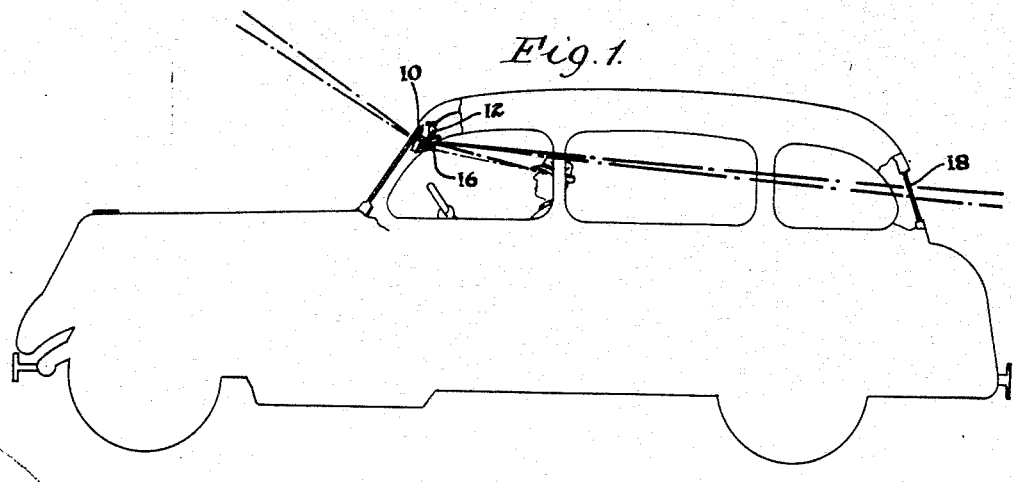
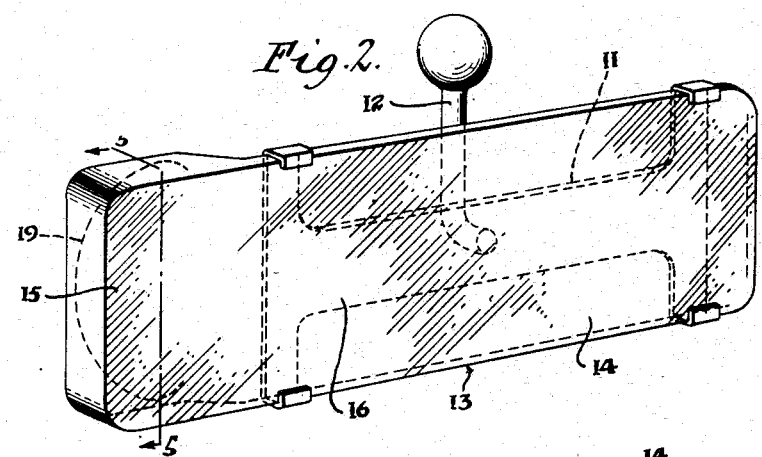
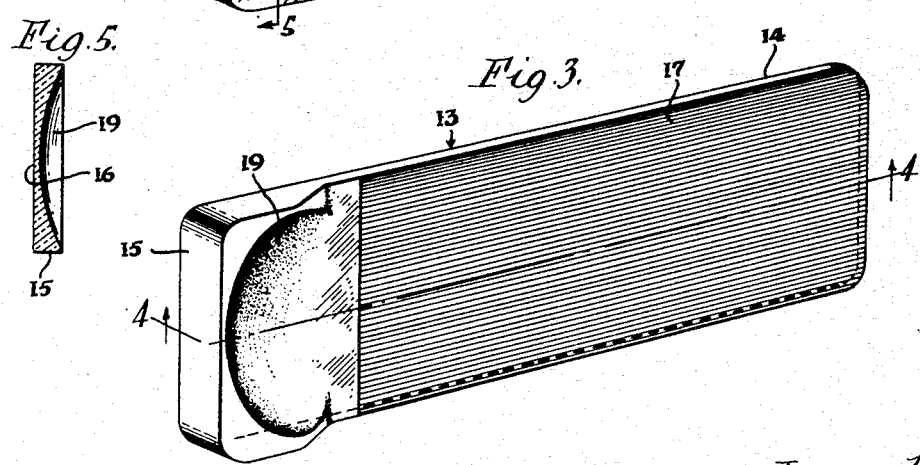
Inventor
Harvey C. Schneider
by John S. Powers
Attorney Patented Mar. 1, 1938

2,109,932

UNITED STATES PATENT OFFICE 2,109,932

IMAGE FORMING DEVICE FOR AUTOMOBILES

Harvey C. Schneider, Buffalo, N. Y.

Application June 5, 1936, Serial No. 83,640

1 Claim. (Cl. 88—93)

This invention relates to an image forming device for use in connection with an automobile, the said device being so located with respect to the operator of the vehicle and the windshield and rear window that one image is formed in the device of a predetermined area at the rear of the vehicle while a second image is formed therein of objects in front of the vehicle but out of the normal line of vision of the operator such as, for example, a traffic signal located above a street intersection.

One object of the invention is to provide a device of the kind generally described which is operative throughout a predetermined range of movement, whereby to enable its adjustment in accordance with the requirements of the particular operator.

A further object is to provide a device in which the different images are produced in side-by-side relation so as to be readily apparent to the operator.

A still further object is to provide a device which is simple and economical from a manufacturing standpoint and which is so designed that it may be supported in the desired relation with respect to the operator of the vehicle by a rear view mirror bracket of standard construction.

The invention is illustrated in the accompanying drawing in which:

Figure 1 is a side elevation of an automobile showing a device applied thereto in which the features of the invention are incorporated.

Figures 2 and 3 are perspective views of the front and back, respectively, of the device.

Figure 4 is a longitudinal section taken along line 4—4 of Figure 3.

Figure 5 is a transverse section taken along line 5—5 of Figure 2.

The device, which is indicated generally at 10 (Figure 1), is adapted to be supported adjacent the upper marginal edge of the windshield of the automobile. Preferably it is of the same general outline as a standard rear view mirror and it may, therefore, be supported for universal adjustment in substantially the same manner as the latter, the supporting means in the present instance being sufficiently illustrated for the purpose in view by a showing of the frame 11 (Figure 2) to which the device is clamped and the arm 12 by which the frame is adjustably connected to the supporting bracket.

As illustrated, the device includes a transparent body 13 which may be of glass or any other suitable material, the said body being formed to provide a relatively long thin section 14 and a relatively short thick section 15. Preferably the two sections are so formed that all of the front face 16 of the body lies in the same plane, it being noted that in the illustrated embodiment of the invention the device is supported in such a manner that the front face is directed toward the operator of the vehicle. A coating 17 of suitable reflecting material is applied to the rear face of the thin section 14 of the glass body to provide a mirror, the device being so supported with respect to the operator of the vehicle and the rear window 18 that an image of a predetermined area at the rear of the vehicle will be reflected to the eyes of the operator. The thick section 15 of the glass body is clear in order to permit light from the front of the vehicle to pass through it to the eyes of the operator, the said section being formed to provide a plano-concavo lens 19 which is adapted to refract light from points out of the normal line of vision of the operator. In the embodiment illustrated the lens 19 is so formed that when the vehicle comes to a stop beneath a traffic signal which is located above an intersection at such a point as to be out of the normal line of vision of the operator, the signal can, in such case, be continuously observed through the lens without the necessity of the operator assuming an uncomfortable or awkward position, it being understood that the lens may take any form, other than that shown, which may be necessary to enable refraction of the light from the particular points desired.

It will be apparent from the foregoing that images are produced in the device of objects located in opposite directions with respect to the operator of the automobile, one of the images being of the surroundings at the rear of the automobile and the other being of objects in front of the vehicle but out of the normal line of vision of the operator. The light in the former instance is reflected from the coating 17 of the mirror while in the latter instance it passes directly through that portion of the glass body which provides the lens 19. The construction described has the advantage that the images are located in side-by-side relation and hence either can be readily observed with a minimum shifting of the eyes. It will also be apparent that any movement of the device to adjust the mirror to accommodate the operator will be accompanied by a corresponding movement of the lens 19. In order to enable such adjustment without a resultant loss of the images which are produced in the lens the latter is preferably so formed that it is capable of producing an image of an object located at a given point throughout a range of movement which corresponds to the range of adjustment of the mirror. The device, therefore, has the further advantage that it can be adjusted, at will, to meet the requirements of different operators.

I claim as my invention:

A unitary multiple-image forming device for an automobile having a windshield, said device comprising a plate of transparent material located in spaced relation to said windshield and in front of the operator of said automobile, said plate having a silvered mirror portion for producing an image of an area at the rear of said vehicle, and means for mounting said plate for adjustment in the position described, whereby it may be moved to position said mirror portion at an angle which will insure reflection to the particular operator of the automobile of a predetermined area at the rear of said automobile, said plate having a concave lens portion adjacent said mirror portion for refracting to said operator light from an object located in front of said windshield but out of his normal line of vision, said lens portion extending across the width of said plate a distance such that it will produce the refracted image of said object in relatively close proximity to the reflected image in the mirror portion of said plate throughout the range of adjustment of the latter.

HARVEY C. SCHNEIDER.